Jan. 19, 1954

J. W. PAYNE 2,666,524

PROCESS FOR SEPARATING GEL PARTICLES

Filed Jan. 31, 1952

INVENTOR.
John W. Payne
BY
Raymond W. Barclay
ATTORNEY

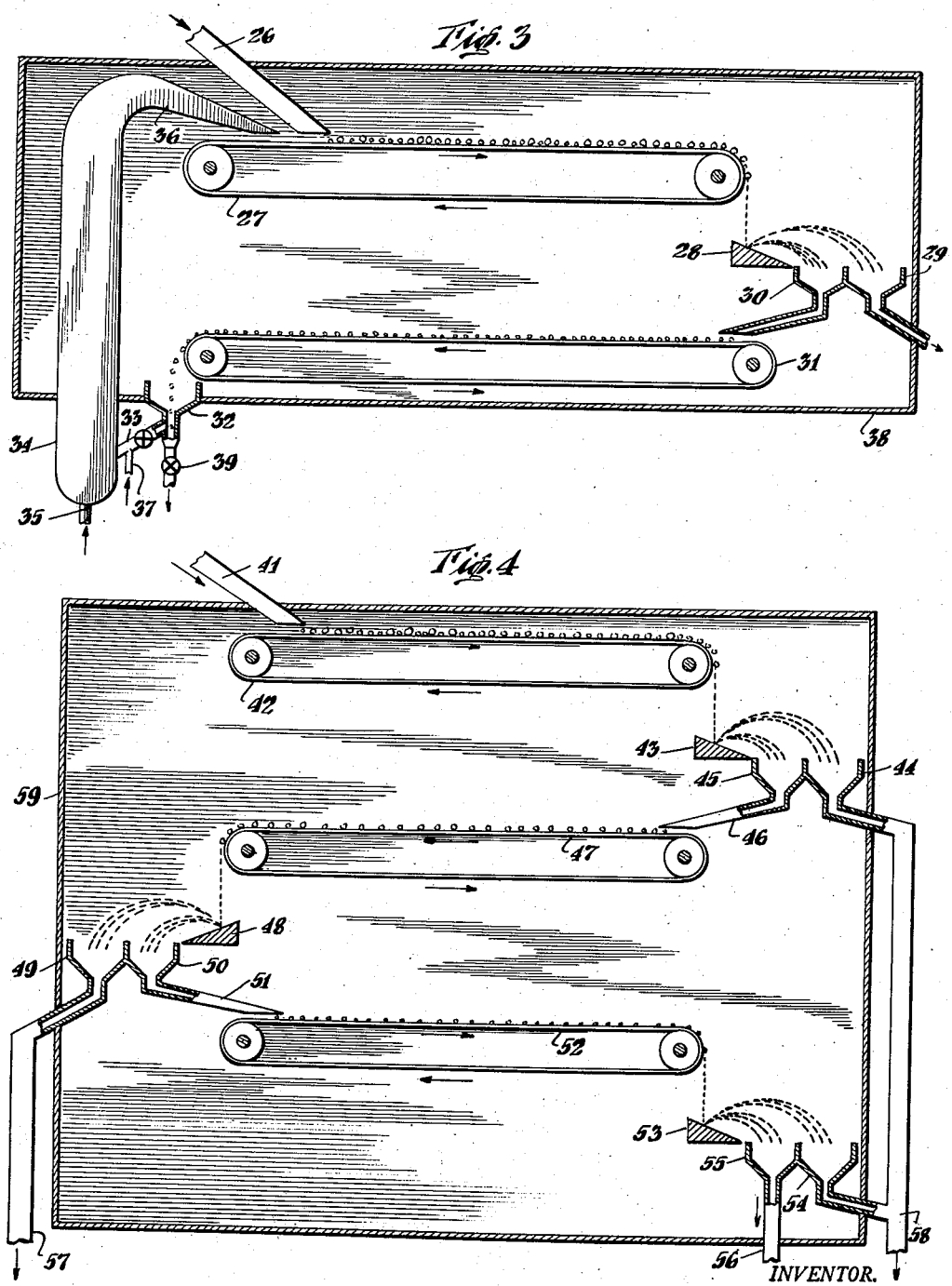

Patented Jan. 19, 1954

2,666,524

UNITED STATES PATENT OFFICE 2,666,524

PROCESS FOR SEPARATING GEL PARTICLES

John W. Payne, Woodbury, N. J., assignor to Socony-Vacuum Oil Company, Incorporated, a corporation of New York Application January 31, 1952, Serial No. 269,161

6 Claims. (Cl. 209—119)

This invention relates to an improvement in the production of inorganic oxide gel spheroids and more particularly is concerned with a method for separating the finished spheroidal gel particles from a mixture of the same with fines and irregularly shaped small pieces of gel resulting from breakage of a portion of the spheroidal particles during the course of their manufacture.

In recent years, considerable interest has developed in the manufacture of inorganic oxide gels as spheres, primarily because of the advantages inherent in this type of physical form. A number of processes for making spheroidal gel particles have been described in the art, such as, for example, the method of Marisic set forth in U. S. Patent 2,384,946. Briefly, this method involves the preparation of a gelable inorganic oxide hydrosol characterized by a relatively short time of gelation. The hydrosol is admitted in the form of separate globules to a body of oil or other water-immiscible fluid in which the globules assume a spheroidal shape and set to a hydrogel. The spheroidal hydrogel particles so obtained may be washed, base-exchanged, heat treated, or otherwise processed to obtain the desired physical and chemical characteristics in the final product. The form of the particles is generally maintained substantially constant from a time prior to gelation until after the gel has been dried. During drying, the hydrogel spheres shrink considerably, usually to about one-tenth of their original volume. The extent of drying will depend somewhat on the use which it is desired to make of the product but, in any event, the drying is carried to a stage beyond that at which maximum shrinkage of the gel is obtained. The gel particles, after syneresis or shrinkage thereof has been completed, are substantially dry; that is, the gel possesses open pores free of liquid although it still contains a relatively small percentage of strongly adsorbed water which is evolved during the final drying and tempering operations carried out at substantially higher temperatures. Drying of the hydrogel particles is preferably accomplished with superheated steam in accordance with the process described in U. S. Patent 2,397,350. The dried gel particles containing approximately 10 per cent by weight of water are thereafter suitably tempered in a kiln at an elevated temperature, for example, of about 1300° F. The gel particles are then cooled and the fines and broken pieces of gel which have accumulated during the course of drying and tempering are separated from the desired spheroidal gel beads.

One of the difficulties encountered in the formation of the above-described spheroidal gel particles has been the large loss of particles due to breakage of the beads with resultant production of gel fines and irregularly shaped pieces of gel. Such breakage is caused primarily by shattering of the desired gel particles during the drying operation. This shattering apparently results from internal stresses which develop within the spheroidal particles as the liquid phase is removed. While various methods have been proposed for reducing the extent of gel breakage during the drying and tempering operations, some breakage is almost invariably encountered in commercial operation due either to the aforementioned internal stresses or to fracture and attrition of the dry gel beads upon physical contact with one another. The resultant gel fines and irregularly shaped pieces of gel are necessarily removed from the desired spheroidal gel particles before the latter can be employed for their intended purpose.

One method heretofore used for separating the finished spheroidal gel beads from a mixture of the same with broken beads has been to conduct the gel product to a screening unit of mesh size such that the gel fines and broken pieces of gel pass through the screen while the beads are retained on the screen. Such method in practice has been found to have several disadvantages. Thus, additional bead breakage occurs on the screen due to a grinding effect exerted on the whole beads by the fines and broken beads already present in the mixture undergoing separation. Considerable difficulties are also caused by screen plugging and fouling, which necessitates periodic brushing of the screen. Furthermore, special type screens are required for effecting the desired separation since conventional square mesh screens become fouled very quickly with beads which jam into the screen openings and are extremely difficult to dislodge even with frequent brushing.

The present invention is directed to a method for separating the finished dried spheroidal gel particles from a mixture of the same with fines and irregularly shaped pieces of gel. The procedure described herein takes advantage of certain characteristics of the desired gel beads, namely, their elasticity and spheroidal shape. The method involves dropping the mixture of whole and broken beads from a predetermined height onto an inclined base of sufficient hardness as to cause the desired spheroidal particles to rebound. The whole gel beads, due to their spheroidal shape, traverse longer trajectories than the irregularly shaped broken pieces of gel and gel fines admixed therewith. The whole gel beads are thus separated from the broken beads by collecting the same in different receptacles or chutes. The particles in the receptacle most remote from the inclined base are the desired spheroidal gel beads while the particles in the receptacle adjacent to the inclined base constitute the irregularly shaped pieces of gel and fines resulting from breakage of the whole beads.

The selection of whole beads may be made increasingly sensitive by passing the mixture of whole and broken beads undergoing separation through a plurality of the above-described selector operations. Since imperfection in sphericity can lead to some spread of trajectories, it will at times occur that whole beads will not travel far enough to be deposited in the receptacle or chute most remote from the inclined dropping base. The probability that, in a second dropping of the same particles, a similar line of trajectory would be followed is extremely small, however. In fact, to a good approximation, assuming the probability of being improperly selected in one selector operation is 10 per cent, then the probability of being selected improperly a second successive time would be only one per cent. It is believed evident that a selection to a high degree of almost any desired extent may be realized by having a larger number of successive selector operations. Thus, in order to separate the desired whole beads with greater refinement or to reduce error, the procedure generally need only be repeated a multiple number of times and in each operation only the particles having the outermost trajectories selected.

The invention may be further understood by reference to the attached drawings wherein:

Figure 3 is an elevational view partly in section showing an alternate apparatus set-up suitable for the continuous selective operation.

Figure 4 is an elevational view partly in section illustrating an apparatus designed for a plurality of successive selector operations.

Figure 1:
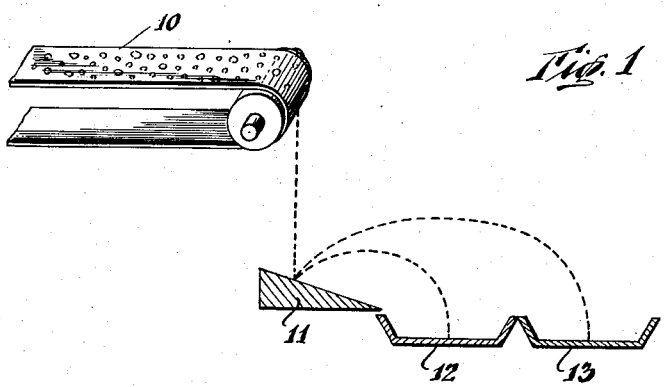
Figure 1 is an illustration of a simple embodiment of the invention.

Referring particularly to Figure 1, a mixture of whole and broken gel beads, all of which have undergone substantially complete shrinkage, are dropped from a moving belt 10 onto an inclined base 11. The whole beads, due to their spheroidal shape, rebound from the inclined plate in a line of greater trajectory, whereas the broken irregularly shaped beads rebound from the inclined plate in a line of lesser trajectory. The particles of lesser trajectory are collected in a receptacle 12 adjacent to the inclined base and the whole beads of greater trajectory, collected in receptacle 13, remote from the inclined base.

Figure 2:
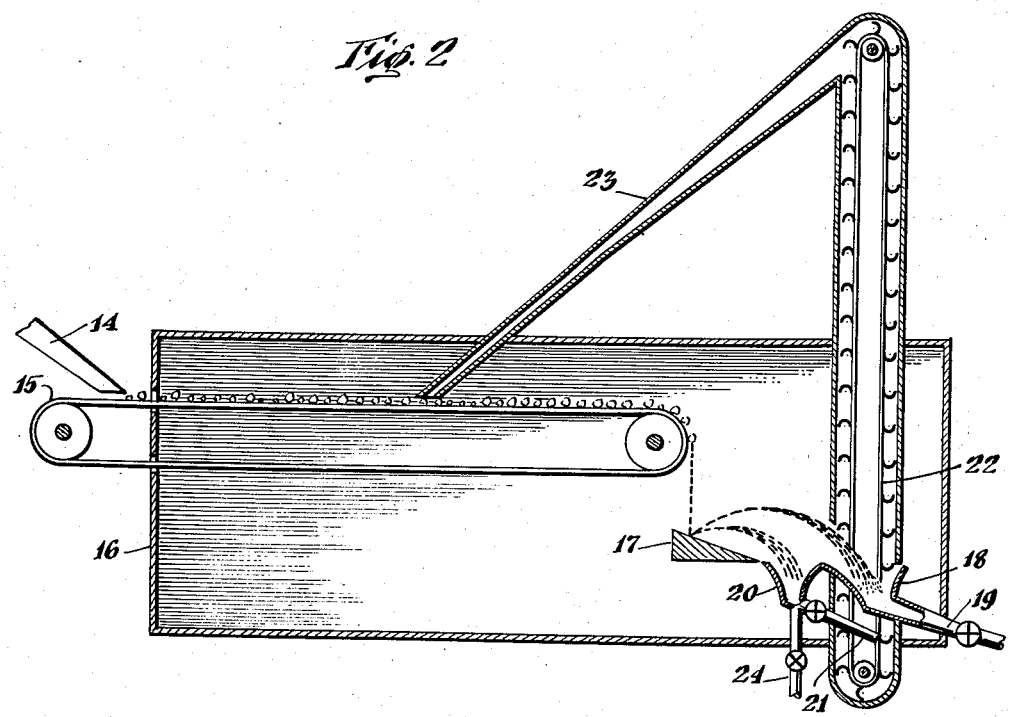
Figure 2 is an elevational view partly in section illustrating suitable apparatus for accomplishing a continuous selective process employing principles of the invention.

Turning now to Figure 2, a dried mixture of whole and broken gel beads are conducted by means of trough 14 onto an endless moving belt 15 which passes through chamber 16. The gel particles continue passage along the belt and drop from the end thereof onto inclined base 17 of a sufficiently hard material as to cause the particles to rebound. The whole beads rebound with a greater trajectory into chute 18 and pass from the apparatus through outlet conduit 19. The irregularly shaped broken beads and gel fines rebound with a lesser trajectory into chute 20. The latter particles pass through conduit 21 and enter a bucket type elevator 22. The particles are then lifted from the point of entrance to an elevated point at the top of the elevator. From said elevated point, the particles are dumped from the elevator buckets through conduit 23 which serves to recycle the particles passing therethrough to the endless moving belt 15. This continuous process, as pointed out above, serves to eliminate any spread of trajectories due to imperfection in the spherical form of the particles. To prevent accumulation of broken gel beads and fines in the apparatus, these are removed at intervals through outlet 24.

Referring to Figure 3, a dried mixture of whole and broken gel beads are led through conduit 26 onto an endless moving belt 27. The mixture passes along the moving belt and the particles drop from the end thereof onto an inclined plate 28. Whole spheroidal gel particles rebound from the inclined plate in a line of greater trajectory and fall into receptacle 29. The irregularly shaped broken gel particles rebound in a line of lesser trajectory and fall into receptacle 30. The latter particles pass from receptacle 30 onto a second endless moving belt 31, moving in a direction opposite to that of the first belt. The particles pass along the second moving belt and fall from the end thereof into a receptacle 32. The particles then pass through conduit 33 into a gas lift chamber 34. A gas, such as air, steam, or other gas inert to the particles, is conducted through pipe 35 and serves to lift the gel particles in chamber 34 vertically upward. The particles thereafter pass from chamber 34 through outlet conduit 36 and are thus recycled onto moving belt 27. A vapor seal is maintained in conduit 33 by passage of a gas through pipe 37. This gas will generally be the same gas as that conducted through pipe 35. Surrounding the two endless belts is a wall 38 defining a chamber. The accumulation of broken gel beads and fines in the apparatus is prevented by periodic removal thereof through outlet 39.

In the apparatus of Figure 4, a mixture of whole and broken gel beads is conducted by means of trough 41 onto an endless moving belt 42. The particles, comprising whole spheroidal beads and irregularly shaped broken beads and gel fines, pass along the surface of the endless belt and drop from the end thereof onto an inclined base 43. The gel spheroids rebound from said base in a line of greater trajectory and fall into receptacle 44. The remaining particles, comprising mostly gel fines and broken beads, rebound from base 43 in a line of lesser trajectory and fall in receptacle 45. The latter particles are conducted through conduit 46 and pass onto the surface of a second moving belt 47 which is moving in a direction opposite to that of the first belt. The particles move along the second moving belt and drop from the end thereof onto a second inclined base 48. Whole beads present in the mixture rebound from base 48 in a line of greater trajectory and fall into receptacle 49. The remainder of the particles, made up for the greater part of irregularly shaped broken gel beads and fines, rebound from plate 48 in a line of lesser trajectory and fall into receptacle 50. The latter particles pass through conduit 51 onto the surface of a third endless moving belt 52 moving in a direction opposite to that of the second belt. The particles pass along the surface of the third moving belt and drop from the end thereof onto a third inclined base 53. Remaining whole beads present in the mixture rebound from base 53 in a line of greater trajectory into receptacle 54. Broken beads and gel fines rebound from base 53 in a line of lesser trajectory and fall into receptacle 55, from which they are conducted to storage through conduit 56. The desired whole gel beads are removed from the outermost receptacles and pass into conduits 57 and 58. The endless belts are enclosed within a chamber 59. It will be understood that the number of endless moving belts and inclined bases employed will depend upon the extent of desired separation of the whole and broken gel beads being processed. It is contemplated that any convenient number of endless belts and inclined bases may be employed in achieving the objects of the invention.

The following example will serve to illustrate the process of the invention without limiting the same:

*Example*

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil, the depth of which was 8 feet. The globules of solution fell through the oil and gelled before passing into a layer of water located beneath the oil. The time of gelation for the concentrations and proportions of reactants given above was about 4 seconds. The spheroidal particles of gel were conducted out of the bottom of the column into a stream of water and, on removal from the water, base-exchanged with an aqueous solution of aluminum sulfate and water-washed. The pellets were then slowly and uniformly dried in superheated steam at about 300° F. and thereafter calcined at about 1300° F. to yield particles having a size of between about 4 and about 20 mesh.

The resulting hard, glassy spheroidal gel beads contaminated with gel fines and irregularly shaped particles resulting from breakage of the beads were then dropped from a height of 21.5 inches in a vertical line onto an inclined metal plate. The angle of inclination of the metal plate was 22.5° with the horizontal. The dropped particles rebounded from the surface of the inclined metal plate. The whole gel beads rebounded in a line of greater trajectory and were collected in a tray remote from the inclined metal plate. The irregularly shaped broken beads rebounded in a line of lesser trajectory and were collected in a tray adjacent to the inclined metal plate. A baffle 11.5 inches in height separated the two trays. All particles which rebounded a distance of at least 21.5 inches from the point of dropping were collected in the tray remote from the metal plate. In this single step selection process, about 38 per cent of all the whole beads present were collected in the outermost tray. The remaining 62 per cent of whole beads, due to imperfection in sphericity or collision with other beads, fell short of the outermost tray and were collected in the tray adjacent to the inclined glass plate, as were the irregularly shaped broken beads and gel fines.

It will be evident from the foregoing example that the procedure of this invention affords an effective means for selectively separating a mixture of whole and broken spheroidal inorganic gel particles. It is to be noted that the whole and broken gel beads undergoing separation have previously been subjected to identical drying conditions and that they consequently are substantially identical with regard to water content and degree of hardness. It is essential for purposes of the present invention that the mixture of gel particles undergoing separation be characterized by a substantially identical degree of hardness since the elasticity property relied upon herein for separation is directly related to the liquid content and consequently the gel hardness. Should the mixture being separated by the present process comprise gel particles of varying degrees of liquid content or hardness, it is apparent that the instant method for separating whole and broken gel beads would become unduly involved and cumbersome since whole beads having different degrees of liquid content or hardness would themselves have varying trajectories upon dropping the same on an inclined plate as described above. Under such conditions, irregularly shaped broken gel beads and softer whole beads of somewhat greater moisture content might very well have the same trajectories upon dropping and consequently be incapable of separation by this means. It is accordingly essential for successful operation of the instant process that the gel particles undergoing separation be characterized by a substantially identical degree of hardness.

While the particles will be dropped generally in a vertical line onto the inclined base, it is within the purview of this invention to vary the angle of incidence between the path of the falling particles and the plane of the inclined base. Thus, for grazing incidence, the particles will rebound considerably less than for angles near to the perpendicular. The inclined base is made of a material of sufficient hardness as to cause the gel particles falling thereon to rebound. Generally, the inclined base will be made of metal, glass, porcelain, or any other material having the requisite hardness. The angle of inclination of the base likewise may be varied, depending on the nature of the inorganic gel particles being separated. Generally, however, the angle of inclination of the inclined base will be between about 5 and about 45° with the horizontal.

Separation of the mixture of whole and broken gel beads, in accordance with the instant process, may be carried out on the dried beads before tempering or, as will generally be the case, the mixture after tempering will be subjected to the described separation with collection of the finished beads.

I claim:

1. A method for separating a mixture of whole and broken spheroidal bead-like gel particles, each of which is characterized by a substantially identical degree of hardness, which comprises dropping a mixture of said particles from a predetermined height onto an inclined base of sufficient hardness as to cause the particles to rebound and collecting the particles of lesser trajectory in one receptacle and the particles of greater trajectory in a second receptacle.

2. A method for separating a mixture of whole and broken spheroidal bead-like gel particles, each of which is characterized by a substantially identical degree of hardness, which comprises dropping a mixture of said particles from a point of predetermined height onto an inclined base of sufficient hardness as to cause the particles to rebound, collecting the particles of lesser trajectory in one receptacle and the particles of greater trajectory in a second receptacle and recycling said particles of lesser trajectory to said point of dropping.

3. A continuous process for separating a mixture of whole and broken spheroidal bead-like gel particles, each of which is characterized by a substantially identical degree of hardness, which comprises continuously dropping a mixture of said particles from a point of predetermined height onto an inclined base of sufficient hardness as to cause the particles to rebound, collecting the particles of lesser trajectory in one receptacle and the particles of greater trajectory in a second receptacle, conducting said particles of lesser trajectory to a vertical gas lift, thereby causing the gel particles contained therein to rise to an elevated point in said lift and recycling said particles from said elevated point to said point of dropping.

4. A continuous process for separating a mixture of whole and broken spheroidal bead-like gel particles, each of which is characterized by a substantially identical degree of hardness, which comprises dropping a mixture of said particles from a predetermined height onto an inclined base of sufficient hardness as to cause the particles to rebound, collecting the particles of lesser trajectory in one receptacle and the particles of greater trajectory in a second receptacle and thereafter dropping said particles of lesser trajectory from a predetermined height onto a hard, inclined base a multiple number of times to attain selective separation thereof.

5. A method for separating a mixture made up of gel spheroids and irregularly shaped gel fragments of smaller particle size, which comprises dropping such mixture, all particles of which have dried to a substantially identical liquid content, from a predetermined height onto an inclined base of sufficient hardness as to cause the particles to rebound and collecting the particles of lesser trajectory in one receptacle and the particles of greater trajectory in a second receptacle.

6. A method for separating a mixture made up of gel spheroids and irregularly shaped gel fragments of smaller particle size, which comprises dropping such mixture, all particles of which have dried and tempered to a substantially identical liquid content, from a predetermined height onto an inclined base of sufficient hardness as to cause the particles to rebound and collecting the particles of lesser trajectory in one receptacle and the particles of greater trajectory in a second receptacle.

JOHN W. PAYNE.

References Cited in the file of this patent

UNITED STATES PATENTS

| Number | Name | Date |
|---|---|---|
| 159,853 | Staniford | Feb. 16, 1875 |
| 643,912 | Schunk | Feb. 20, 1900 |
| 873,326 | Pearce | Dec. 10, 1907 |
| 1,155,292 | Torrey | Sept. 28, 1915 |
| 1,704,056 | Nearing | Mar. 5, 1929 |
| 2,260,095 | Stone | Oct. 21, 1941 |
| 2,304,554 | Dixon | Dec. 8, 1942 |
| 2,607,482 | Weisz | Aug. 19, 1952 |

FOREIGN PATENTS

| Number | Country | Date |
|---|---|---|
| 98,459 | Germany | July 28, 1898 |
| 5,783 | Great Britain | of 1899 |
| 656,038 | France | Dec. 24, 1928 |